R. B. ALLENDER.
NUT LOCKING DEVICE.
APPLICATION FILED DEC. 9, 1911.
1,022,810.
Patented Apr. 9, 1912.
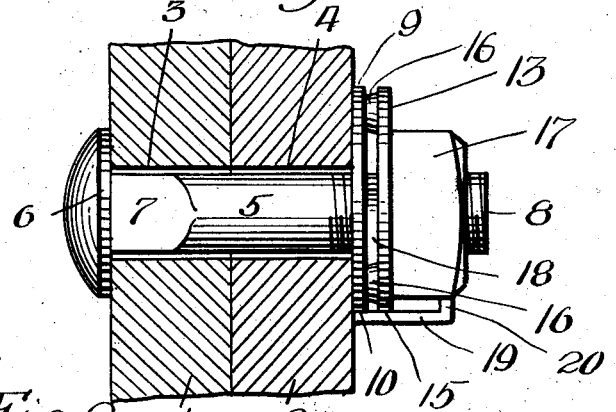
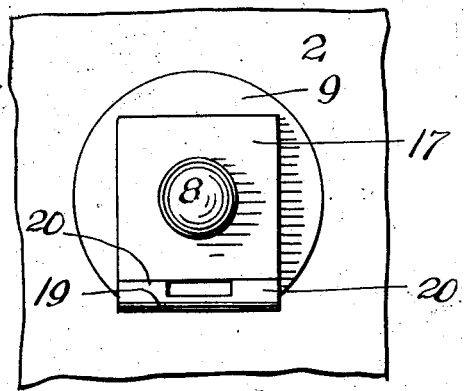
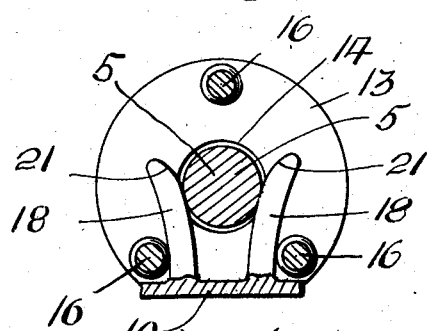
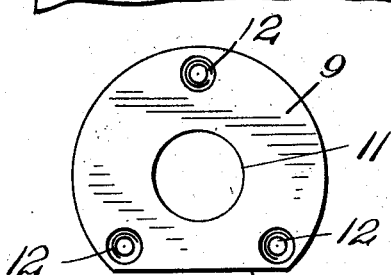
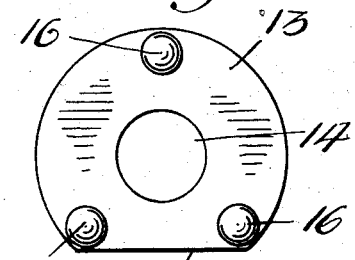
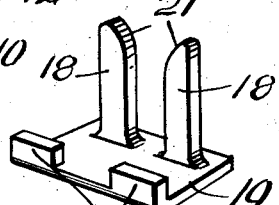
WITNESSES
INVENTOR
R. B. Allender
BY
ATTORNEYS

UNITED STATES PATENT OFFICE.

ROBERT B. ALLENDER, CLAYSVILLE, PENNSYLVANIA.

NUT-LOCKING DEVICE.

1,022,810.  Specification of Letters Patent.   Patented Apr. 9, 1912.

Application filed December 9, 1911. Serial No. 664,826.

*To all whom it may concern:*

Be it known that I, ROBERT B. ALLENDER, a citizen of the United States of America, residing at Claysville, in the county of Washington and State of Pennsylvania, have invented certain new and useful Improvements in Nut-Locking Devices, of which the following is a specification, reference being had therein to the accompanying drawing.

This invention relates to nut locking devices, and the objects of my invention are, first, to provide a nut locking device that can be advantageously used in connection with rail joints, bridges, rolling stock and structures subjected to vibrations that have a tendency to displace nuts from bolts or rods; second, to provide a nut locking device that can be easily and quickly installed without the use of skilled labor, for positively locking a nut upon a bolt, and third, to accomplish the above results by a device that is inexpensive to manufacture, durable and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is a side elevation of a nut locking device in accordance with this invention. Fig. 2 is a front elevation of the same. Fig. 3 is a cross sectional view of the nut lock. Fig. 4 is a front elevation of one of the washers of the nut lock. Fig. 5 is a similar view of the other of the washers employed. Fig. 6 is a perspective view of a detached locking member.

The reference numerals 1 and 2, denote by the way of an example, two pieces of material having alining openings 3 and 4. Arranged in the openings 3 and 4 is a bolt 5 having a head 6 engaging the piece of material 1, an oval portion 7 locking the bolt from rotation within the opening 3, and a threaded end 8 protruding from the opening 4 of the piece of material 2.

Arranged upon the threaded end of the bolt against the piece of material 2 is a washer 9 having one edge thereof flat, as at 10, a central opening 11 to provide clearance for the bolt 5, and sockets 12 for a purpose that will presently appear. Arranged upon the threaded end 8 of the bolt 5 is a washer 13 having an opening 14 providing clearance for the bolt, a flat edge 15 and pins or protuberances 16 adapted to extend into the sockets 12 of the washer 9, said pins corresponding in number to said sockets and spacing said washers apart. Screwed upon the threaded end 8 of the bolt is a nut 17 that retains the pins 16 of the washer 13 in engagement with the washer 9. Driven between the washers 9 and 13 are the malleable parallel prongs 18 of a locking member 19, said member having lugs 20 engaging one of the facets of the nut 17, said lugs spacing the member relatively to the facet of the nut, whereby a suitable instrument can be inserted between the member and the nut for prying or forcing the member out of engagement with said nut. The prongs 18 are beveled, as at 21 and said prongs are adapted to ride between two of the pins 16, engaging the bolt 5 and spreading with respect to each other as the member is driven home or into position for locking the nut with respect to the bolt. The prongs 18 engage the bolt 5 and said prongs are frictionally held or clenched, retaining the member 19 in engagement with the flat edges 10 and 15 of the washers 9 and 13 respectively, and the lugs 20 in engagement with the facet of the nut.

The nut locking device cannot become accidentally displaced, but can be removed when it is desired to remove the nut from the bolt. The device can be used in connection with an ordinary nut and bolt without injury to either.

While in the drawing there is illustrated a preferred embodiment of the invention, it is to be understood that the structural elements are susceptible to such changes as fall within the scope of the appended claims.

What I claim is:—

1. In a nut locking device, the combination with a bolt and nut, of a washer mounted upon the bolt and having sockets in one face, a washer mounted upon the bolt and having pins formed on one face and extending into the sockets of the other washer, said pins constituting spaced means for said washers, a locking member engaging the facets of said nut, and prongs extending between said washers and said pins and having the ends thereof spread by contacting with said bolt.

2. In a nut locking device, the combination with a bolt and nut, of washers arranged upon said bolt and held in spaced relation with respect to each other, a locking member engaging the nut, prongs carried by said member and extending between said washers and having the ends thereof clenched, and lugs carried by said member and spacing the latter relatively to said nut whereby said prongs can be pried from between said washers.

3. In a nut locking device, the combination with a bolt and nut, of a washer mounted upon the bolt, a washer mounted upon the bolt and having laterally projecting means engaging the other of the washers for maintaining said washers in spaced relation with respect to each other, a spaced locking member engaging the nut, and prongs carried by said member and extending between said washers and engaging the bolt, said prongs maintained in clenched position with respect to the bolt by the means carried by one of the washers.

4. In a nut locking device, a bolt provided with a nut, a pair of washers positioned upon the bolt and spaced from each other, each of said washers having a portion of its edge flattened, a locking member engaging the flat edges of said washers and one of the facets of the nut, and prongs carried by said member and extending between the washers and engaging the bolt whereby the ends of the prongs will be clenched to hold said member in engagement with the nut.

In testimony whereof I affix my signature in the presence of two witnesses.

ROBERT B. ALLENDER.

Witnesses:
G. T. HOLMES,
E. D. NOBLE.

---

Copies of this patent may be obtained for five cents each, by addressing the "Commissioner of Patents, Washington, D. C."